US006816074B2

(12) United States Patent
Wong (10) Patent No.: US 6,816,074 B2
(45) Date of Patent: Nov. 9, 2004

(54) AUTOMATED DELIVERY AND INVENTORY STATUS NOTIFICATION SYSTEM AND METHOD

(76) Inventor: Chon Meng Wong, 34 Mark Dr., Lincoln, RI (US) 02865-4007

( * ) Notice: Subject to any disclaimer, the term of this patent is extended or adjusted under 35 U.S.C. 154(b) by 0 days.

(21) Appl. No.: 10/244,542

(22) Filed: Sep. 17, 2002

(65) Prior Publication Data

US 2003/0052778 A1 Mar. 20, 2003

Related U.S. Application Data

(60) Provisional application No. 60/322,754, filed on Sep. 18, 2001.

(51) Int. Cl.$^7$ ............................................... G08B 13/14
(52) U.S. Cl. ..................... 340/569; 340/570; 340/545.6; 232/27
(58) Field of Search ................................. 340/569, 570, 340/545.6, 545.3, 551–565; 232/27, 36, 37

(56) References Cited

U.S. PATENT DOCUMENTS

| 4,262,839 A | | 4/1981 | Wisniewski | 232/35 |
|---|---|---|---|---|
| 4,314,102 A | * | 2/1982 | Lowe et al. | 179/2 |
| 4,999,612 A | * | 3/1991 | Cherveny | 340/569 |
| 5,036,310 A | * | 7/1991 | Russell | 340/569 |
| 5,247,282 A | | 9/1993 | Marshall | 340/569 |
| 5,328,169 A | | 7/1994 | Mandel | 271/290 |
| 5,861,805 A | * | 1/1999 | Reeves | 340/569 |
| 6,003,070 A | | 12/1999 | Frantz | 709/206 |
| 6,028,517 A | | 2/2000 | Sansone et al. | 340/569 |
| 6,085,170 A | | 7/2000 | Tsukuda | 705/26 |
| 6,155,482 A | | 12/2000 | Perry | 232/35 |
| 6,275,154 B1 | * | 8/2001 | Bennett et al. | 340/569 |
| 6,433,684 B1 | * | 8/2002 | Lie | 340/569 |

OTHER PUBLICATIONS

International Search Report of PCT/US02/29544.

* cited by examiner

Primary Examiner—Toan Pham
(74) Attorney, Agent, or Firm—Steptoe & Johnson LLP (57) ABSTRACT

An automated, flexible and programmable system to update delivery and inventory status for an aggregate of remote mailboxes, bins, shelves, sorter bins, and/or a plurality of bins to distant customers and vendors through email, pager, personal digital assistant (PDA), cellular phone mail, voice mail at call centers and/or web site mailboxes. It can function as a delivery notice to mailbox recipients or as inventory stock management to store owners and vendors at remote locations. Various sensors mounted on flexible circuit boards located on the mailboxes, bins, or shelves together with distributed microcontrollers report status through a common bus to a master controller and then to a computer system. The computer in turn dispatches reports and information to various owners and vendors via a remote network operation center accessed through a dedicated line, a wireless service or an Internet Service Provider. The frequency of report update, changing of locations of update, and the relational database can also be reprogrammed at any time from a remote central service location.

24 Claims, 6 Drawing Sheets

AUTOMATED DELIVERY AND INVENTORY STATUS NOTIFICATION SYSTEM AND METHOD

The present application claims priority under 35 U.S.C. § 119 to U.S. Provisional Application Ser. No. 60/322,754, filed Sep. 18, 2001, the disclosure of which is expressly incorporated by reference herein in its entirety.

BACKGROUND OF THE INVENTION

1. Field of the Invention

This invention relates to the general method of updating the delivery/stock status of mailboxes, shelves, sorter bins, and a plurality of bins located at Post Offices, Companies or shelf space at supermarkets, department stores, and reporting to the respective owners, recipients and/or vendors of these boxes via email, pager, PDA, cellular phone message system, website mailboxes and voice mail at a call center. The invention can be implemented at the Post Office mailboxes, company mailboxes, apartment mailboxes, store shelves at supermarkets, department stores, etc. The update information is to alert the recipient via email, pager or voice mail when any mails or articles are delivered to their mailboxes currently or the shelves with certain items are empty or close to empty and need inventory replenishment and management.

2. Discussion of the Prior Art

Previous devices involve the use of mechanical trigger mechanisms to the doors and hinges of mailboxes. The device described in U.S. Pat. No. 4,262,839 involves a mechanical visible indicator to show the delivery status. Such devices will not be able to provide remote delivery status far from the mailbox site and do not address the case of thousands of mailboxes with their recipients' locations remote and dispersed all over the world. Another example of this type of device including a magnet is described in U.S. Pat. No. 6,155,482. A drawback of these type of door trigger mechanism is that while they indicate that a door has been opened, this does not imply actual mail delivery.

A device described in U.S. Pat. No. 5,427,282 uses an audible or visual signal to indicate the delivery. It is achieved by using a control box that has a DC circuit activated by the delivery site which in turn controls an AC circuit which allows a receptacle to turn on its power. This electrical receptacle can power an electric appliance to signal the recipient. This system does not signal outside of the immediate area.

In the reproduction industry, multiple copies of printed sheets are sorted into bins for job separation. They are fitted with an integral optical transmitter/receivers unit to distinguish which of the bins are still empty and available in response to the respective electrical bin empty signals. This is described in U.S. Pat. No. 5,328,169. Because printer sorters are designed to handle paper, they cannot be used with arbitrarily shaped packages, objects, or fluids. Nor are printer sorters capable of handling thousands of bins at once. Such demands are not faced by the copy reproduction industries.

In the peripheral equipment industry, equipment requires monitoring and maintenance. The equipment may be a PBX or ACD, and there is an interface device that converts the output from the equipment to email messages so that a technician at a remote site can be informed. This type of interface device and an email interpreter are described in U.S. Pat. No. 6,003,070. This costly interface email device has to be present at every piece of equipment that requires monitoring. Its design would not be suitable to the monitoring of thousands of simple bins. Thus, it is limited in the total number of bins.

In the arena of managing delivery of goods U.S. Pat. No. 6,085,170 describes a system that is designed for supporting delivery of purchased goods or commodities from a distribution center to the purchaser. This system tracks deliveries by way of bar code or smart card requiring the production of a special marker.

SUMMARY OF THE INVENTION

The invention relates to the method of information updating the many diverse clients the status of the delivery and/or quantifying the articles located in a site with many mailboxes/bins/containers. This is performed through the use of sensors, flexible circuit boards, distributed microcontrollers capable of scanning the sensor information and reporting its status through a common bus and identifying its electronic address, and sending this information to a master controller which directly collects all information and serially updates a computer system. In turn, this computer system has relational database containing email address, pager address, personal digital assistant address (PDA), cellular phone address, call center addresses, preferably web sites or the like, such that the client can use the information for a pick up or determine an order to be placed for inventory management.

The scanning of information is performed at a regular or preset rate or activated upon delivery and allows an accurate report on the status of these mailboxes/bins/containers located remotely, and their unrelated customers or vendors distributed over vastly dispersed geographical locations and time zones. These customers/vendors can also be mobile while information is updated. This also has the capability of frequently reprogramming the report information, customer list, or locations from another remote facility. Customers can also call to a call center with its Personal Identification Number (PIN) or other forms of authentication to retrieve a voice mail of the status.

In the scenario of an inventory management system, this reporting can be tied to the vendor that supplies the merchandise and update the status of the supplier's inventory system to initiate delivery.

Therefore its ability to report and reprogram from a remote facility allows the system to be maintained, reroute the information reliably, and keep its function versatile.

The invention includes notifying recipients of objects in mailboxes, bins and shelves by a system that preferably includes a sensor, a flexible circuit board, a mailbox address identifier, an embedded subsystem data collection center, a computing device with wireless modem or cable modem and a database containing email addresses, pager addresses, phone mail addresses, website URLs, Call Center database and a program to direct the delivery status to these locations. The notification may be in broadcast mode. This enables multiple recipients to receive the delivery status simultaneously without addition cost.

A preferred embodiment of the claimed invention may be used to with a plurality of vending machines. In such an embodiment, the vending machines preferably provide notification of their inventory status, including whether restocking is required.

The mailboxes, bins, and shelves may be spaces where item is stored temporarily or permanently having no innate active signaling capability of its own content. The sensors provide active identification of letters, parcels, merchandise and objects of various shapes, sizes and materials.

An embedded system data collection device receives signals from the sensors and relays the signals to a central processor. The data collection device may be a microcontroller based device that reads a corresponding delivery state from each bin and sends a detailed combined state report to a central computing device with a standard protocol including bin address information. The serial RS232, RS485, Universal Serial Bus (USB), and IEEE-1394 Firewire busses are useful for the final stage reporting from the aggregate processor to a computer such as a personal computer, single board computer, or embedded processor. The aggregate processor can be a CAN processor having both CAN bus and RS232/RS485/USB/IEEE-1394 Firewire bus on the same micro-controller. The USB and IEEE-1394 firewire are preferable, as they can transfer high speed data as fast as 12 Mbits/s and 400 Mbits/s respectively, but any of the busses mentioned herein are allowable.

The computing device may include a wireless modem or cable modem. The computer may be a personal computer or embedded microcontroller system with sufficient memory to store and run an application program capable of sending email, voice mail, and pager mail. In the cases of email or two-way pagers, a choice of acknowledgement can be done. This will confirm that recipient has acknowledged and the date stamp is in place.

According to a preferred embodiment, a system for notifying of the presence or absence of an object or fluid is presented. The system includes a plurality of containers and a plurality of sensor units. Each sensor unit is associated with one of the containers, and each sensor unit includes at least one sensor configured to detect the presence or absence of the object or fluid within the container. At least one microcontroller is connected to some of the plurality of sensor units. A computer is connected to the microcontroller. A signaling mechanism is connected to the computer, the signaling mechanism being configured to provide an alert in response to the presence or absence of the object or fluid in each of the plurality of containers.

Various optional and preferable features of the above embodiment include a bus assemblage interposed between the microcontroller and the computer. The bus assemblage preferably includes a first level bus operating at a first speed connected to the microcontroller, and a second level bus operating at a second speed interposed between the first level bus and the computer. The first speed is preferably different from the second speed. The system may include a master embedded controller interposed between the computer and the microcontroller. The system preferably includes a receiving mechanism capable of receiving the alert. The receiving mechanism may be an email receiver, a web message center, a wireless telephone, a land line telephone, a SMS messaging device, a pager, a personal digital assistant, a broadcast receiver, or a voice mailbox. The sensor is preferably an optical sensor, a light sensor, a pressure sensor, a weight sensor, a capacitance sensor, a magnetic sensor, a hall effect sensor, a float sensor, a heat sensor, a temperature sensor, a motion sensor, or an acoustic sensor. The sensor unit preferably includes a flexible circuit board. The sensor unit is preferably associated with a unique address. Preferably, the system includes a database containing data representing an email address, a pager address, a personal digital assistant address, a cellular phone number, a call center address, or a web site URL, and the signaling mechanism provides an alert consistent with the data. Preferably, each of said sensor units is configured to identify at least one property of the object or fluid, where the property is preferably one of size, shape, weight, dielectric properties, magnetic properties, and volume.

According to another preferred embodiment of the present invention, a method for notifying of the presence or absence of an object or fluid is presented. A container configured to hold an object or a fluid is presented. A sensor unit associated with the container senses the presence or absence of an object or fluid. In response to said sensing, a first signal is forwarded to a microcontroller connected to the sensor unit. In response to the first signal, a second signal is sent from the microcontroller to a computer. An alert in response to the second signal is provided, where the alert is indicative of the presence or absence of the object or fluid.

Various optional and preferable features of above embodiment include that the sending includes sending the second signal at a first speed on a first level bus connected to the microcontroller; and sending the second signal at a second speed different from the first speed on a second level bus interposed between the first level bus and the computer. The sending preferably includes sending to a master embedded controller interposed between the computer and the microcontroller. The method preferably includes receiving the alert at a receiving mechanism, where the receiving mechanism is an email receiver, a web message center, a wireless telephone, a land line telephone, an SMS messaging device, a pager, a personal digital assistant, a broadcast receiver, or a voice mailbox. The sensing senses at least one of light, pressure, weight, capacitance, magnetism, hall effect, float position, heat, temperature, motion, and sound. The sensor unit preferably includes a flexible circuit board. The sensor unit is preferably associated with a unique address. Preferably, the providing includes providing the alert consistent with data representing an email address, a pager address, a personal digital assistant address, a cellular phone number, a call center address, or a web site URL. The sensing preferably includes sensing at least one property of the object or fluid. The property is preferably size, shape, weight, dielectric properties, magnetic properties, or volume.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, in reference to the noted plurality of drawings by way of non-limiting examples of certain embodiments of the present invention, in which like numerals represent like elements throughout the several views of the drawings, and wherein.

DETAILED DESCRIPTION OF THE EXEMPLARY EMBODIMENT

The scope of the invention is defined by claims at the conclusion of this detailed description of the preferred embodiments. However, the organization, operation, advantages and objects of the invention can be more fully appreciated from the following description.

1) System Components

Figure 1:
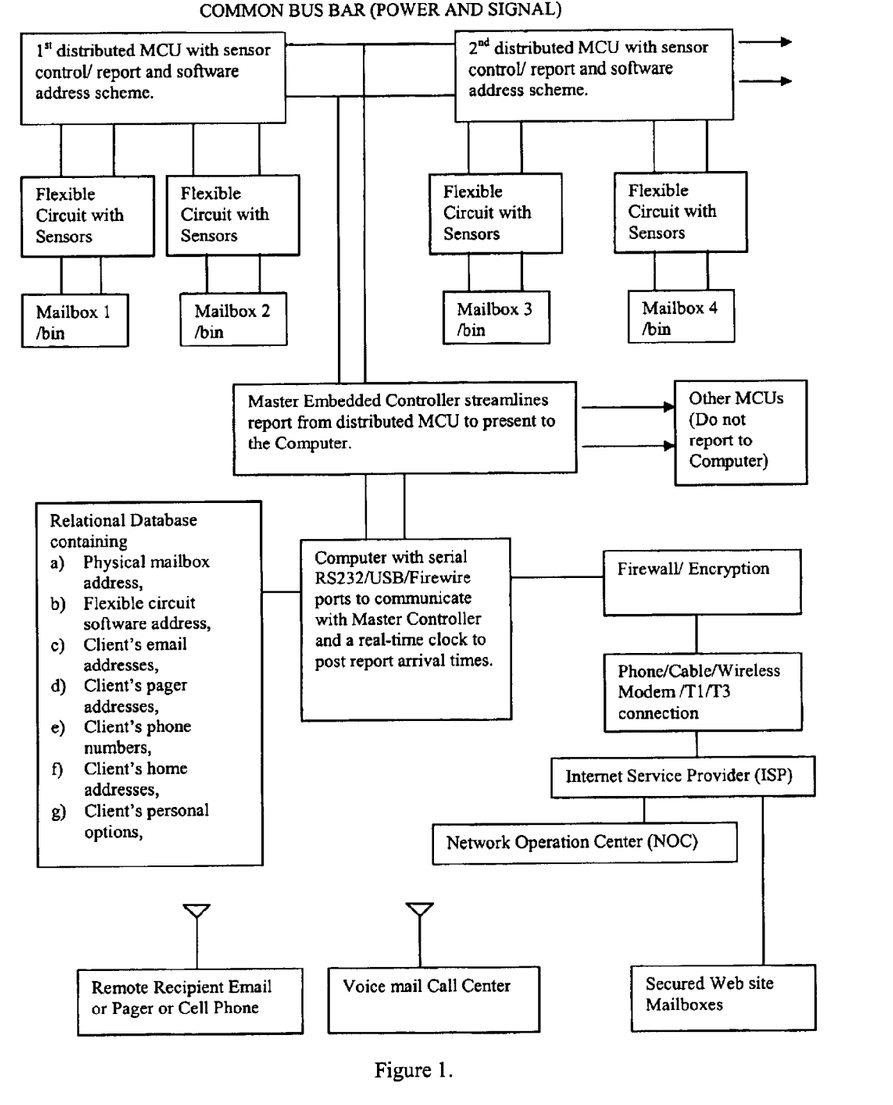
FIG. 1 is block diagram for the remote mail delivery notification and shelf inventory management system.

This invention involves the use of certain block elements and FIG. 1 summaries their relationship:

a) Sensors Assembly
b) Flexible Circuit Assembly
c) Distributed Microcontrollers with Master Controller
d) Common Bus architecture and addressing schemes
e) Computer System as an Application Server
f) A Relational Database
g) Communication with a wireless nationwide networks provider through a Network Operation Center (NOC), a Voice mail Call Center (CC) and Internet Service Provider (ISP) with web server.

FIG. 1 depicts a block diagram of a preferred embodiment.

2) Sensors Assembly

Sensors that can be used in the mailbox/bin/container assembly can be any of the following types:

i) Light or Optical Sensor,
ii) Pressure or weight Sensor,
iii) Capacitance Sensor,
iv) Magnetic and/or Hall effect Sensor,
v) Float Sensor,
vi) Heat/temperature sensor
vii) Motion sensor
viii) Acoustic sensor
ix) Any combination of the above sensors.

The choice of sensors depends on the functional requirement of the system. In the mailbox delivery notification system, the two common sensors used are Optical and weight sensors. However, in an inventory notification system, any type of appropriate sensors may be used depending on what kind of inventory is being stored. The use of several sensors placed at different locations in the mailbox/bin allows objects with different sizes and shapes to be detected. The use of Polymer Thick Film Technology as a pressure and weight sensor allows quantification of the weight and count for the article stored in the mailbox or bin. The use of a capacitance sensor allows determination the material stored through its dielectric properties. The use of magnetic and/or hall-effect sensors quantifies ferromagnetic materials. And the use of float sensors allows determination of liquid quantity.

Figure 2:
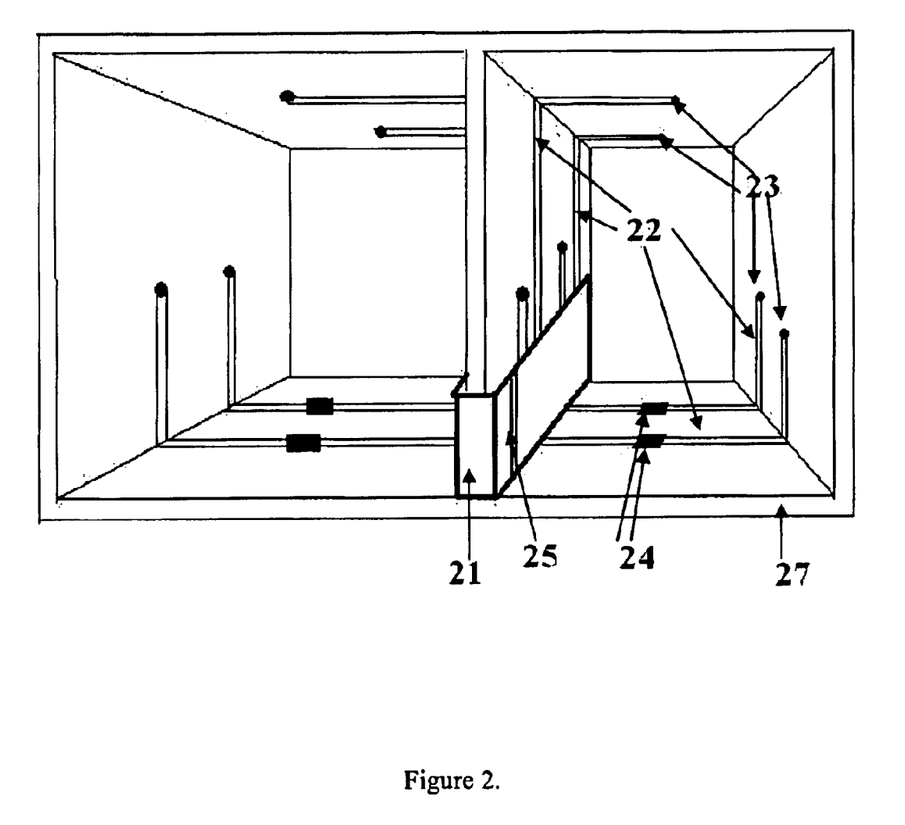
FIG. 2 illustrates a cross section of a mailbox having an assembly in the clip form of a distributed microcontroller with flexible circuit connector with several flexible circuit boards with optical detectors and LEDs.

FIG. 2 Illustrates a cross section of a preferred embodiment having a mailbox 27 with an assembly 21 in the clip form of a distributed microcontroller with flexible circuit connector 25 with several flexible circuits 22 with optical detectors 24 and LEDs 23.

3) Flexible Circuit Board Assembly

Figure 3:
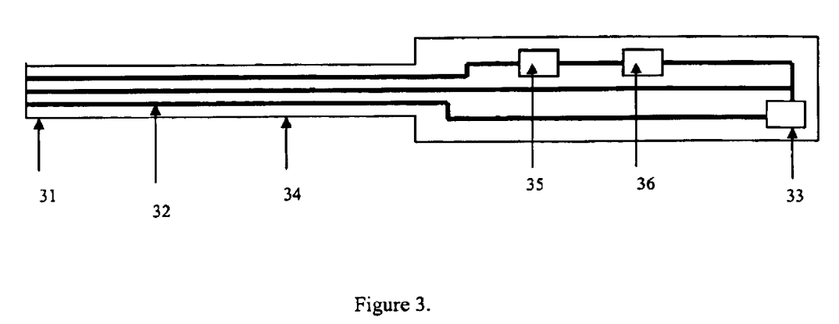
FIG. 3 illustrates an example of a typical flexible circuit made of copper Kapton, or Polymer Thick Film (PTF) Ink on Mylar or other substrate films mounted with a resistor, an active LED (sensor) and an optical detector (sensor).

The sensors are preferably mounted on a flexible circuit board. FIG. 3 illustrates a preferred embodiment of a flexible circuit 31 made of copper Kapton, or Polymer Thick Film (PTF) Ink 32 on Mylar 34 or other substrate films mounted with a resistor 35 an active LED 36 (sensor) and an optical detector 33 (sensor). A flexible sensor circuit comprises a low profile copper flexible circuit or Polymer Thick Film (PTF) flexible circuit (FIG. 3) mounted with a single sensor or multiple sensors for the purpose of attachment to the inner surface of the Mailbox (FIG. 2). The use of flexible circuit boards allows the sensors to be mounted and attached to the contour of the mailbox/bin walls or shelves by adhesive. Such flexible circuit boards are very thin and flat, and are not obstructions to the article to be placed in the mailbox/bin. As a flexible circuit can adapt to any contour, it can attach to the walls or embedded in the mailbox structure of any shape or sizes for optimal mail/article detection. The flexible circuit board may comprise conductive traces or wires on a flexible insulating substrate such Kapton, Mylar, Paper and any combination thereof. The polymer thick film (PTF) flexible circuit board may employ conductive ink as the conductive traces, such as silver ink, carbon ink, or conductive polymer based inks; but the types of traces or wires are not limited by these examples. The flexible circuit performs the function of housing the sensor and is strategically located on the mailbox/bin/container to perform a detection of articles and quantify their presence without obstructing existing space.

The flexible circuit board may have an added bus for memory devices such as a flash EPROM to reside. This memory device stores an address for use in identifying the sensor attached and consequently the location of the mailbox/bin. The flash EPROM also allows the address to be redefined, allowing the flexibility of programming the custom address at the mailbox/bin site.

The method of knowing whether there is mail or article is present is via the placement of the sensors such that the article obstructs an optical path. For example an optical path can be constructed from a Light Emitting Diode (LED) and a light detector. A LED will emit light when an appropriate voltage is supplied matching its polarity. A light detector is a device that generates a voltage when the light of the right wavelength shines on it. A current limiting resistor is normally connected in series with the LED. This voltage would be controlled by the microcontroller described in the next section. It also can drive the LEDs to light up as a series of flashes or pulses for coding purposes. When the LED flashes a sequence of pulses and the light detector can obtain the same sequence of pulses then there are no opaque objects in between. In the particular case of the mailbox, then there is no mail or parcel placed in the optical path. However, if a letter or parcel, which is opaque, is placed in the optical path, the detector will not receive the expected pulses. This confirms a delivery is made to the mailbox/bin/container.

The LEDs and light detectors are placed at several locations to capture the various standards of mail articles. Several LEDs located at different location (FIG. 1) of the mailbox/bin are scanned sequentially to provide different light angle projection to a detector to pick up various mail article sizes.

For supermarket shelves, the blockage of the light path indicates the present of the remaining stock. A shortfall in stock will alert the purchasing department to stock up its shelves.

Figure 4:
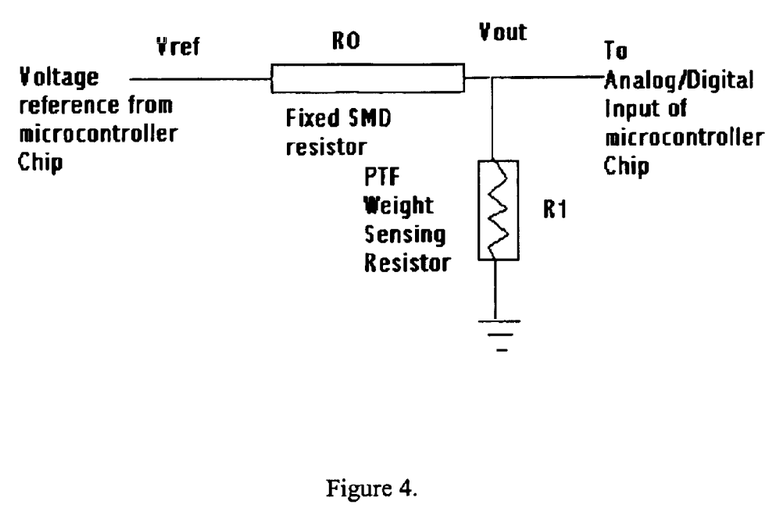
FIG. 4 Weight/pressure sensing using PTF conductive ink technology and its circuit implementation FIG. 5 A hybrid bus with two separate CAN busses on two levels.

The use of different types of sensors like pressure, capacitance and Hall effect devices allow different types of physical quantities to be detected. For example, a pressure sensor can be a weight sensor, it acts like a scale to determine the quantity of items present if each item weight is known, including individual items, or groups of like items in contained crates. A low cost Polymer Thick Film (PTF) circuit made out of PTF carbon/conductive polymer or other conductive ink can be used a pressure as well as a weight sensor. This flexible circuit when flexed and/or compressed under a weight, changes its PTF ink resistance values dramatically. It can be deployed as a weight sensor for quantifying the article/articles weight placed in the mailbox/bin. In such cases the PTF resistances are first calibrated by using a circuit resistance divider to voltage detection circuit as shown in FIG. 4. FIG. 4 illustrates a weight/pressure sensing using PTF conductive ink technology and its circuit implementation. The output voltage, Vo, is given by the resistance ratio, $R1/(R0+R1)$ multiplied by the reference voltage, Vref supplied by the microcontroller. The PTF Ink weight-sensing resistor has resistance value similar to the fixed surface mount resistor, R0. Under a compression force, the PTF resistance can drop significantly, thereby giving the weight of the article placed on it.

Since the custom printed PTF Ink weight sensor can cover the entire bottom surface of the mailbox/bin, the placement of any article with weight will be detected. This will normally distinguish a parcel from a regular mail. In the inventory management case where each bin contains only one type of article, this weight sensor is used to count the number of same articles in the bin if the weight of one article is known. The individual article weight is pre-stored in the relational database.

A capacitance sensor can distinguish different dielectric materials and therefore can identify the type of article material placed in the mailbox/bin. There are many types of capacitive sensors. Some are based on Field Effect Transistors structures (FETs) where the gate voltage is very much influenced by the dielectric material. These FETs can be made of semiconductor materials such as silicon or conductive polymer material.

A hall-effect sensor can be used as both a weight sensor and a ferromagnetic material sensor.

An opaque inert floating object can be used as an obstruction to an optical path. Then an optical detection system such as LEDs and optical diodes can be mounted on the outer wall of the bin if it is made out of a clear material like glass or clear polymer. If the opaque-floating object has a mirror like surface, angle of reflection between LED, float mirror and the optical diode pair can be used to quantify the liquid volume. This is used for measuring liquid volume if the bin or container geometry is well defined. Other float measuring devices using radio frequency and/or Doppler effect are alternative methods to liquid volume measurement can be used for inventory keeping. Such liquid measurement may be used for applications in gasoline reserves at a filling station or medicines at a pharmacy, but are not limited to such applications.

4.) Distributed Microcontrollers with Master Controller

The flexible circuits with sensors are connected to the input/output port of a distributed microcontroller (MCU). The input port can also be either an analog or digital. An analog input port can read in voltage and convert it to a discretized digital value (such as 8 bits/10 bits). A digital input port will register either a "1" or "0" depending on the voltage input. An output port will source either a "1" or "0" voltage output to drive an LED or other devices. The master controller may be included in one of the distributed microcontrollers, or may be a separate device. The microcontroller performs several functions. The functions are:

a) To initiate sensing by sending voltage pulses to light up the LEDs. This initiation is performed under a preferred condition, e.g., it receives a call from the master controller when its address is called upon, it can initiate by itself after a preset time, or a signal change from the sensor wakes up the microcontroller. This sensor can be other than the optical sensor.

b) A report of the current sensor's state is sent together with a unique address to the common bus periodically or upon initiation. The unique address allows the service to distinguish the specific status is from an aggregate of mailboxes/bins. The unique address depends very much on the bus protocol.

c) On the other hand to conserve energy, the distributed MCU goes into a sleep mode but periodically checks the sensor. As soon as a mail or article is inserted in the box, the sensor signal level changes and wakes up the MCU. The MCU sends a signal to the master controller. The master controller acknowledges and then goes through the cycle of information collection.

5.) Common Bus Architecture and Addressing Scheme

The Common Bus Architecture is used with the distributed microcontrollers because it is the information highway network for them to communicate all information. There must also be a bus network protocol that allows information to be distributed in a systematic manner without collision, or loss of information. The electronic bus is used to allow distributed microcontrollers located near the location of the mailboxes to report their status with other microcontrollers that can be located far apart from each other. At the same time they are capable of communicating with each other, having electronic addresses for messages. The microcontrollers identify the flexible circuit sensors connected to the particular microcontroller.

In this system, there are aggregate of mailboxes or bins that are usually identified uniquely. The system typically uses an electronic address identifier for each mailbox or bin. Each mailbox/bin is equipped with one or more sensors reporting its occupancy together with an address identifier. This requires the use one of the selected technologies for the group of devices capable of providing a network bus protocol and a unique identifier scheme.

The bus itself can be in the form of another flexible circuit or multi-wire cable connecting to the several low-power embedded processors through polling schemes by the Master processor. This bus is not limited to Controller Area Network (CAN), TCP/IP, or Inter-Integrated Circuit (I2C). This bus carries both power and signals to and from each distributed microcontroller and with minimal number of insulated conductor lines. Using low profile small cross-section busses, it makes it easier to mount to the edge of the mailboxes with little obstruction and yet retain aesthetic values.

Other bus possibilities include wireless transmission using smart card, bluetooth, 802.11 and telephone two-wire technology. However, the demand on the processor to have added radio frequency and other modulation/demodulation complicates processor electronics and raises cost.

The tight spaces between the mailboxes/bins demand the use of such network bus. The ideal bus characteristics are: a shared common bus with as few conductor lines as possible, preferably serial and capable of direct connection with thousands of similar electronic devices.

Serial mode addressing is preferred, as it requires only few address lines to access thousands of slave processors, however, any bus system may be used. A polling technique is preferred. First the computer checks the relational database for mailbox addresses to update. The computer sends a slave address to the master controller. In turn, the master controller wakes up the distributed microcontroller. The distributed microcontroller acknowledges the call and replies the master controller.

A following instruction is sent to initiate sensor measurement and the microcontroller reads the sensors' result. A sensor status report is then sent to the master controller. The master controller acknowledges it and then sends the distributed microcontroller back to sleep. Several reports are collected and sent to the computer.

There will be at least one or more microcontroller reporting the aggregate of all the mailboxes/bins status to a computer such as a personal computer, single board computer, or embedded processor. The computer has an associated database and is capable of sending email/voice/pager mail to call center. That controller reporting to the computer/single board computer/embedded processor is referred to here as the aggregate or master controller. Such a system can be achieved from deploying the following bus architecture but not limited to the list:

a) Controller Area Network (CAN) is an advanced serial bus system that efficiently supports distributed control systems such as micro-controllers, sensors and actuators. This serial bus is preferably constructed out of two-wire circuit namely, a CAN-H line and a CAN-L line, which can either be screened or unscreened. Standard CAN version 2.0B protocol has an 11-bit identifier capable of handling 2048 unique addresses. An extended CAN protocol uses a 29-bit identifier and therefore can handle up to 536,870,912 unique addresses. When a CAN processor with its input/output port connected to the sensors through the flexible circuits, which are physically attached to the mailboxes/bins, the extensive CAN message ID scheme can be deployed to identify each of the mailboxes/bins. Furthermore, a sub-address scheme can be added uniquely identifying each of input/output allowing one CAN processor to service several mailboxes/bins. Such bus architecture increases the capacity to handle several thousand processors as oppose to the limited addressing scheme in Inter-Integrated Circuit (I2C). In addition, this bus architecture can achieve a transmission rate of 1 Mbit/s rate, fast enough to handle all CAN processors in the network spaced up to 40 meters (130 feet) apart. For longer distances, the data rate can be reduced: for distances up to 500 meters (1,625 feet) a speed of 125 kbits/s is possible, and for transmissions up to 1 kilometer a data rate of 50 kbits/s is permitted. Therefore this superior capability and versatility allows thousands of CAN processors attached to mailboxes/bins to communicate even when they are physically very far apart. CAN is a very reliable network which provides both sophisticated error-detection and error handling mechanisms, and high immunity against electromagnetic interference. The cost/performance ratio is also ideal for this application.

The C505C 8-bit MCU family from Infineon Technologies has Analog/Digital Input/Outputs and complete CAN capability is a suitable candidate for this application. The MCP2502X/MCP2505X family of devices from Microchip is another suitable candidate. Other CAN devices are available from many different manufacturers such as Infineon Technologies, Intel, Philips, Microchip, Motorola, National, SGS Thomson, NEC, Fujitsu, Texas Instruments, Bosch, Temic, Unitrode, Mietec, and etc. All these CAN MCU can be used to in a mixed mode provided the same protocol is observed.

b) The Inter Integrated Circuit (I2C) bus architecture also allows several microcontrollers (MCU) to be connected on the same bus. In its fast mode, it can handle bit rate up to 400 kbits/s. A standard 7-bit addressing mode allows 128 slave addresses and an extended I2C bus has a 10-bit addressing mode giving 1024 slave addresses. As opposed to the CAN bus, I2C is a multimaster/multi-slave network interface with collision detection, allowing more than one device controlling it. Each node on the bus may initiate a message and then transmit or receive data. The Serial Data Line (SDA) and the Serial Clock Line (SCL) are the two network lines. Each node on the network has a unique address that accompanies any message passed between nodes.

A master can poll each of the slave processors where each slave MCU is assigned to each mailbox/bin via the sensor enabled flexible circuit attached to its input/output port. Therefore the address of the bin is identified through its unique slave address and the specific I/O port. The status of each bin will then be reported to the master processor. The master processor after resolving the slave and sub bin address will assign a unique address to each bin-status report and sent to the Personal Computer. Although the 10-bit addressing allows a thousand unique addresses, the bus cannot physically support a thousand devices connected to it. Furthermore, long bus lengths are not possible with I2C. Such bus deployment has a limit on number of mailboxes/bins attached to it. To overcome this limitation, the invention employs either a bus repeater or a combination with another bus architecture.

An example of MCU of this class is the PIC16C717 from Microchip. Other manufacturers include Philips, Intel, Motorola, National, Hitachi, NEC, Ipsil etc.

c) A TCP/IP controller device that decodes an Internet Protocol (IP) address only activates the sensor when it matches the IP address on the signal line and returns the delivery state of the mailbox/bin. These are Internet enabled devices and can have large number of nodes on the network. These TCP Controller-on-a-Chip devices form a low-cost Local Area Network and do perform the required bus function, but it is more costly and complex than CAN/I2C Network solutions. The use of low cost TCP/IP address devices allows sensors to use Internet Protocol methods to communicate and associate the sensor location and address electronically. The sensor would be active when the IP address called upon matches its device IP address. Examples of TCP/IP controller device are IPu7931Z/IPu8931Z Controller from Ipsil and S-7600A iChips from Seiko Instruments.

d) Other networks which may be used for the bus include, AS-I, ARCNET, BATIBUS, BITBUS, EIB, INTERBUS-S, LON, MODBUS, PNET, PROFIBUS, SERCOS, VAN, WORLDFIP.

Some surface mount address devices such as a flash EPROM or Electrically Erasable Programmable Read Only Memory (EEPROM), which can be attached on the flexible circuit, so that the circuit itself has a unique address. This software address can be programmed in and read by the microcontroller. This allows an address attached to the data sent by the sensor and in turn, received by master controller to identify its status and as well as its source address.

e) An electronic address identifier for each mailbox or location can be performed by a Dual-In-Line Package (DIP) switch, with the flexible circuit attached to it. This is known as hardware addressing. The address is set by using the position settings of the DIP-switch. This can be a sub address (i.e. address extension to the main microcontroller address).

f) Combinations of the above address methods may also be used for a hybrid system. Some devices have two or more types of busses available and therefore allow hybrid bus architecture. For example, an I2C bus may be combined with a CAN bus or an I2C bus may be combined with TCP/IP. Two busses of the same type may also be used. The choice of using PIC16C717 with I2C bus for the distributed microcontrollers and the use of PIC18F248 for the bridge to transfer data from an I2C bus to a CAN bus is cost effective and efficient. The PIC18F248 is a new chip that has both I2C and CAN bus architecture on the same chip. Ideally, there will be one master PIC18F248 for linking the CAN bus to the UART for a RS232 interface with the computer. Preferably, the invention uses a slower more energy efficient bus architecture amongst the distributed controllers and a faster bus architecture from the master controller and the computer. However, different hybrid designs may be used.

Figure 5:
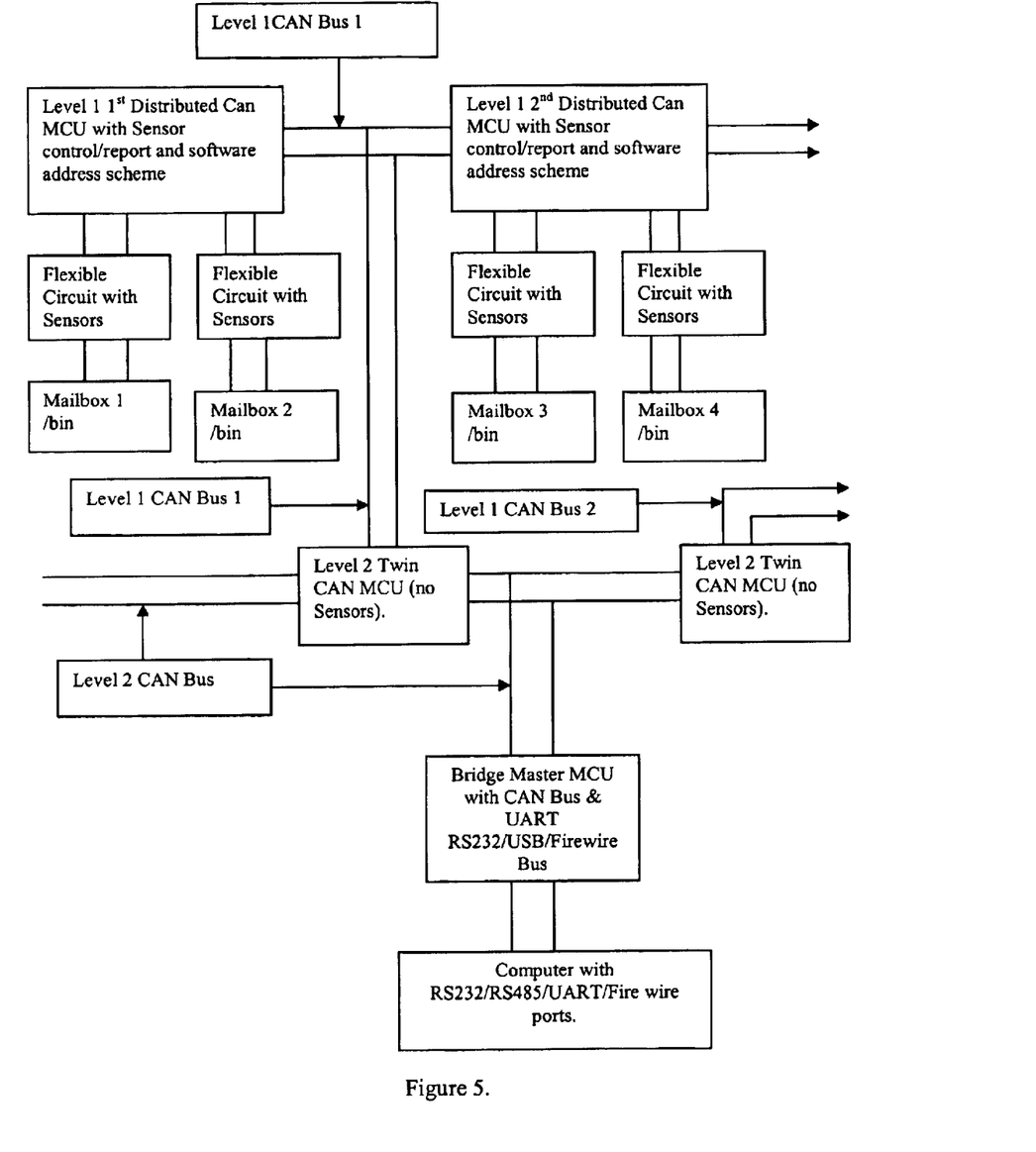

A two tiered bus where both busses are CAN may be used in a preferred embodiment as depicted in FIG. 5. The level 1 CAN MCU can be MicroChip MCP25055 (MCP2505X Family), PIC18F248 (PIC18FXX8 Family) or Infineon Technologies C505 microcontrollers, but is not limited to these embodiments. One advantage of the two bus scheme is that it allows two different clock speeds for each level bus. The level 1 distributed MCU can be very slow, with many level 1 MCUs to one level 2 MCUs. The slow bus saves power and MCU can be in sleep mode when not sensing. The ratio of 64 level 1 MCUs to 1 level 2 MCU is possible for practical purposes so long as the CAN transceiver chip can support it, but this invention contemplates using alternate ratios that the technology can support. An example of a transceiver chip is 82C250. Level 2 MCU may ideally be a Twin CAN processor, but may be other processors. This chip can be an Infineon Technology 82C900 MCU, but is not limited to this device. Other two-tiered busses may have alternate configurations.

Figure 6:
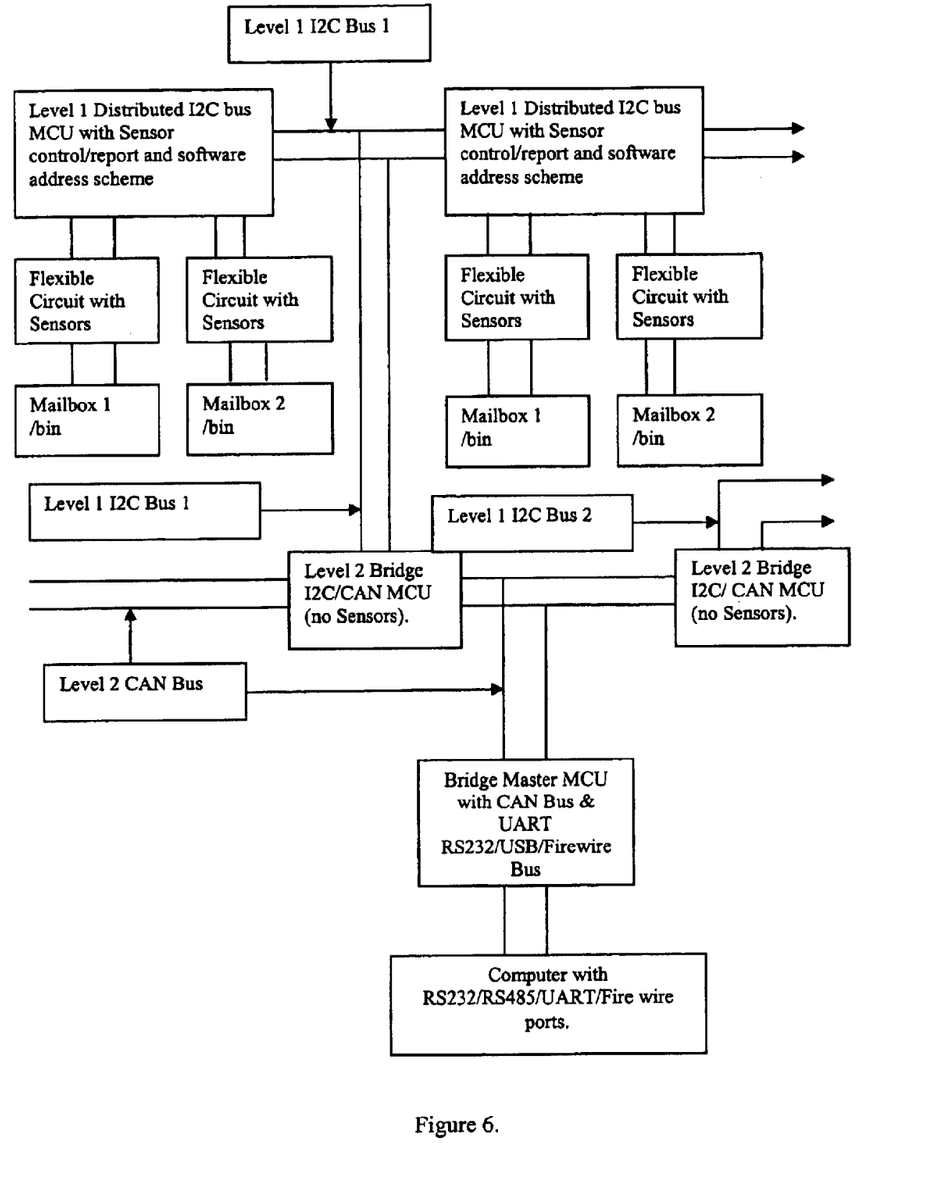
FIG. 6 A hybrid bus with two busses of different types.

An alternate bus system is a hybrid two-bus system with a different bus type for each level, namely, I2C for level 1 and CAN for level 2. FIG. 6 illustrates such a preferred embodiment having a hybrid bus with one I2C bus and one CAN bus. The level 1 I2C MCU can be MicroChip PIC16C717 (PIC16C71X family). The chip PIC16C717 has a particular advantage of a 37 kHz internal clock for low external component count in its usage. At this speed, the I2C bus is still sufficient to collect all the required data. One advantage of this two bus scheme is that a different clock speed may be employed for each bus level. The level 1 distributed MCU can be very slow and there are many level 1 MCUs to one level 2 MCU. The slow bus saves power and MCU can be in sleep mode when not sensing. This enables the bus wire diameter to be preferably smaller and the reporting by each level 1 MCU reported sequentially. The ratio of 25 level 1 MCUs to 1 level 2 MCU is possible for practical purposes. Level 2 MCU is a bridge I2C/CAN processor. This chip can be a PIC Chip PIC18F248 (PIC18FXX8 Family). The Master Level 2 Bridge MCU can be also a PIC Chip PIC18F248 (PIC18FXX8 Family) for sending the aggregate information received from CAN bus to RS232/RS485. The level 2 bus can have a speed of one megahertz, but other speeds are possible.

In one preferable embodiment, the MCU includes an internal clock, which beneficially reduces the number of external components and also reduces the required space. However, MCUs with external clocks may also be used.

6.) Computer System as an Application Server

A computer or embedded computer system will serve as an application server with the following capabilities:

i) An operating system with real time clock and date keeping,
ii) A database storing recipient email, pager addresses, web addresses, call center addresses, PDA addresses, cellular phone addresses and the address of each mailbox,
iii) A communication port, wired modem or wireless connection,
iv) Automatic dial-up capability to an ISP server or a wireless server,
v) Email sending software capability,
vi) Pager/PDA sending software capability,
vii) Updating voice mail at the Call Center,
viii) SMS messaging to update status to cellular phone,
ix) Web message center to update delivery status,
x) A firewall to protect against intrusion,
xi) An authentication scheme to access any relational database,
xii) An encryption scheme to secure stored information, The computer system typically has a RS232/USB/IEEE1394 Firewire port capable of fast serial communication with the master controller. The computer of the class Pentium III and above with 256 Mb RAM and running on a secure operating system with multitasking capability such as Windows NT/2000 is one suitable option to serve as an application server. A relational database program such as SQL Server 7/2000 to store the recipient's contact address can be running on the background. Another custom application program is also running in the background for lookup and maintains the database. This program will respond to the data transfer from the serial port and update the delivery or inventory status in the database. This program is an event driven application. Several dynamic link libraries (dlls) are created in C or another language for the program to initialize handshaking, send email, retrieve email and report status of deliveries after transmitted. At the same time, it will follow the rules stored in the database to decide which information to dispatch to the recipients. A fast connection by T1/T3/DSL through an ISP will send the required email/voice mail/pager/web mail to the Network Operation Center (NOC) (FIG. 1). A secure network with encryption is deployed.

Virtual Private Network (VPN) may be used for maintaining the computer system to update the rules from a remote operation center. This remote operating center can update all different computers located nationwide.

7.) The Relational Database

The relational database preferably contains fields of mailbox digital addresses and a relation description to the fields containing target addresses such as email addresses, pager addresses, web address (URL), phone numbers where the information of the status can be delivered. The relation description can be classified into one-to-one, one-to-many or many-to-one. The message information about the status of the mailbox or bins or shelves will be delivered to the target addresses with a time stamp and location address. This enables the owners, clients and/or vendors to know when the status check has taken place and also its exact location for decision-making. In the case of the phone number, it can be a voice mail or a number where the voice mail is stored. If the owner or vendor needs to find out the status, they can retrieve its voice mail by entering a code for security purposes. This is the same if the message is retrieved from a web site address.

In general, the relational database includes rules for reporting. A rule-based system for reporting via email is preferable, but any rule based reporting system may be used. The rules may specify when, how, and with what frequency the system sends reports via email, pager, cellular telephone, PDA, or voice mail. An additional optional field containing the type of reporting and frequency of reporting allows information to be dispatched to the target addresses upon a triggered status update or scheduled update once a day or multiple updates per day or week according to schedule frequency. The scanning of addresses without replies will lookup the email or pager address corresponding to the scanning address in the database. If there are no email messages sent out for a predetermined time interval, it initiates the automatic email or pager calling function and opens the communication port to send a notification by email or pager. The predetermined time interval is typically a day, but can vary from minutes to weeks. The period may also be random.

An optional field is provided to the record the success of the delivery of the status. This enables the client to know when the information was last retrieved.

The relational database can be tables written in any one of the database software Microsoft Access, Microsoft SQL Server, db2, Oracle, etc.

8.) Communication with a Wireless Nationwide Networks Provider Through a Network Operation Center (NOC), a Call Center (CC) and Internet Service Provider (ISP) with Web Server.

The dispatching of delivery status or inventory status is carried out in one of the following ways:

a) A connection such as a fast T1/T3/DSL to an Internet Service Provider (ISP),
b) A connection to a Network Operation Center (NOC) like Skytel,
c) A satellite link as a backup to the NOC,
d) The NOC will send the messages according to each recipient's address, some are pagers, some are emails,
e) A link to a Call Center or Message Center such that a recipient can call in for status retrieval after verifying a PIN number.

f) In the case of email, two-way pager, choice of acknowledgement can be done. This will confirm recipient acknowledgement and that the date stamp is in place.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A system for notifying of one of the presence and absence of at least one of an object and a fluid, comprising:
    a plurality of containers;
    a plurality of sensor units, each sensor unit associated with one of said containers, each sensor unit comprising at least one sensor configured to detect said one of the presence and absence of said at least one of an object and a fluid within said one of said containers;
    at least one microcontroller connected to some of said plurality of sensor units;
    a computer connected to said microcontroller;
    a signaling mechanism connected to said computer, said signaling mechanism configured to provide an alert in response to said one of the presence and absence of said at least one of an object and a fluid in each of said plurality of containers;
    a bus assemblage interposed between said at least one microcontroller and said computer, said bus assemblage comprising:
        a first level bus connected to said at least one microcontroller, said first level bus operating at a first speed; and
        a second level bus interposed between said first level bus and said computer, said second level bus operating at a second speed; and
        said first speed being different from said second speed.

2. The system of claim 1, further comprising a master embedded controller interposed between said computer and said at least one microcontroller.

3. The system of claim 1, further comprising a receiving mechanism capable of receiving said alert;
    said receiving mechanism is one of: an email receiver, a web message center, a wireless telephone, a land line telephone, a SMS messaging device, a pager, a personal digital assistant, a broadcast receiver, and a voice mailbox.

4. The system of claim 3, wherein said receiving mechanism is configured to provide an acknowledgement in response to receiving said alert.

5. The system of claim 1 wherein said at least one sensor is one of: an optical sensor, a light sensor, a pressure sensor, a weight sensor, a capacitance sensor, a magnetic sensor, a hall effect sensor, a float sensor, a heat sensor, a temperature sensor, a motion sensor, and an acoustic sensor.

6. The system of claim 1, wherein said unit comprises a flexible circuit board.

7. The system of claim 1 wherein said sensor unit is associated with a unique address.

8. The system of claim 1, further comprising a database containing data representing one of: an email address, a pager address, a personal digital assistant address, a cellular phone number, a call center address, and a web site URL;
    wherein said signaling mechanism is configured to provide an alert consistent with said data.

9. The system of claim 8, wherein said database is a relational database; said relational database containing a set of customizable rules;
    wherein said signaling mechanism is configured to provide an alert consistent with said customizable rules.

10. The system of claim 1, wherein each of said sensor units is configured to identify at least one property of said at least one of an object and a fluid.

11. The system of claim 10 wherein said property is one of size, shape, weight, dielectric properties, magnetic properties, and volume.

12. The system of claim 1 wherein said at least one microcontroller is configured to communicate with said computer using at least one a serial protocol.

13. A method for notifying of one of the presence and absence of at least one of an object and a fluid, comprising:
    supplying a container configured to hold the one of an object and a fluid;
    sensing, by a sensor unit associated with the container, the one of the presence and absence of the at least one of an object and a fluid;
    forwarding, in response to said sensing, a first signal to a microcontroller connected to the sensor unit;
    sending, in response to the first signal, a second signal from the microcontroller to a computer, said sending comprising sending the second signal at a first speed on a first level bus connected to the microcontroller and sending the second signal at a second speed different from the first speed on a second level bus interposed between said first level bus and said computer; and
    providing an alert in response to the second signal;
    wherein the alert is indicative of the one of the presence and absence of the at least one of an object and a fluid.

14. The method of claim 13, further comprising sending to a master embedded controller interposed between the computer and the microcontroller.

15. The method of claim 13, further comprising receiving the alert at a receiving mechanism, said receiving mechanism being one of: an email receiver, a web message center, a wireless telephone, a land line telephone, an SMS messaging device, a pager, a personal digital assistant, a broadcast receiver, and a voice mailbox.

16. The method of claim 15, further comprising providing an acknowledgement in response to said receiving.

17. The method of claim 13 wherein said sensing senses at least one of light, pressure, weight, capacitance, magnetism, hall effect, float position, heat, temperature, motion, and sound.

18. The method of claim 13, wherein the sensor unit comprises a flexible circuit board.

19. The method of claim 13 wherein the sensor unit is associated with a unique address.

20. The method of claim 13, wherein said providing comprises providing the alert consistent with data representing one of: an email address, a pager address, a personal digital assistant address, a cellular phone number, a call center address, and a web site URL.

21. The method of claim 20, wherein said providing further comprises providing the alert consistent with a set of customizable rules.

22. The method of claim 13, wherein said sensing comprises sensing at least one property of the at least one of an object and a fluid.

23. The method of claim 22 wherein said at least one property is one of size, shape, weight, dielectric properties, magnetic properties, and volume.

24. The method of claim 13 wherein said sending comprises sending using a serial protocol.

* * * * *